United States Patent [19]
Sugimoto et al.

[11] Patent Number: 5,428,279
[45] Date of Patent: Jun. 27, 1995

[54] SAFETY APPARATUS DETERMINING WHETHER A DETECTED PRESENCE IS A WORK PIECE OR A HUMAN

[75] Inventors: Noboru Sugimoto, No. 3-1-18-21, Nukui Kita-machi, Koganei-shi, Tokyo; Kazumi Narita, Nagoya; Koichi Futsuhara, Urawa, all of Japan

[73] Assignees: Noboru Sugimoto, Tokyo; L. Engineering Co. Ltd., Aichi; The Nippon Signal Co., Ltd., Tokyo, all of Japan

[21] Appl. No.: 170,306

[22] Filed: Mar. 2, 1994

[51] Int. Cl.$^6$ ............. G05B 9/02; G06F 15/46
[52] U.S. Cl. ............. 318/563; 318/467; 318/445; 901/47; 901/49; 340/507; 364/474.2; 361/78
[58] Field of Search ............. 318/445, 450, 449, 456, 318/458, 466, 467, 480, 563; 901/46, 47, 49; 340/573, 825.06, 825.36, 942, 507, 653; 364/436, 474.2, 474.22, 474.26, 474.16, 474.19, 551.01, 551.02; 361/93, 78

[56] References Cited

U.S. PATENT DOCUMENTS

| | | |
|---|---|---|
| 4,309,696 | 1/1982 | Nagai et al. . |
| 4,506,765 | 3/1985 | Payne et al. ............. 318/467 |
| 4,638,445 | 1/1987 | Mattaboni ............. 901/46 |
| 4,661,880 | 4/1987 | Futsuhara . |
| 4,667,184 | 5/1987 | Futsuhara . |
| 4,757,417 | 7/1988 | Futsuhara ............. 361/78 |
| 4,791,588 | 12/1988 | Onda et al. ............. 901/47 |
| 4,994,977 | 2/1991 | Tsujido ............. 364/474.2 |
| 5,161,107 | 11/1992 | Mayeaux et al. ............. 364/436 |
| 5,212,645 | 5/1993 | Wildes et al. ............. 364/474.16 |

FOREIGN PATENT DOCUMENTS

| | | |
|---|---|---|
| 56-168102 | 12/1981 | Japan . |
| 58-126199 | 8/1983 | Japan . |
| 58-132492 | 8/1983 | Japan . |
| 61-100118 | 6/1986 | Japan . |
| 61-168493 | 7/1986 | Japan . |
| 62-130847 | 8/1987 | Japan . |
| 63-84892 | 4/1988 | Japan . |
| 1-222889 | 9/1989 | Japan . |

*Primary Examiner*—William M. Shoop, Jr.
*Assistant Examiner*—John W. Cabeca
*Attorney, Agent, or Firm*—Lowe, Price, LeBlanc & Becker

[57] ABSTRACT

A safety apparatus wherein a sensor ($10_n$ through $15_n$, 16) for transmitting object (M) detection information as a reduction in the output signal energy, is used as a human detection sensor, while a sensor (21–26) for transmitting object (M) detection information as an increase in the output signal energy is used as a work piece detection sensor, and drive of a mechanical moving portion is permitted only when the logical OR output of both sensors has a logical value of "1" corresponding to the high energy condition, thereby reliably ensuring excellent operator safety in a fail-safe manner.

7 Claims, 4 Drawing Sheets

SAFETY APPARATUS DETERMINING WHETHER A DETECTED PRESENCE IS A WORK PIECE OR A HUMAN

TECHNICAL FIELD

The present invention relates to a safety apparatus for ensuring the safety of a human in a space having a working area common to both an industrial machine such as a robot, and a human.

BACKGROUND ART

In spaces having a working area common to both an industrial machine such as a robot, and a human, measures to ensure the safety of the operator are extremely important.

In this respect, article 150 paragraph 4 of the Japanese Industrial Safety and Health Regulations requires an industrial robot to be surrounded by a safety fence.

In carrying out work operations with a robot however, the work to be processed must be brought in to the movable part of the robot, that is to say into the operating region of the robot arm.

In the case of an operating system wherein the work is brought in by a human, operator safety is normally ensured by adopting a system wherein a door is provided at the entrance/exit of the safety fence. When the door is opened for work to be brought in by a human, the drive power source for the robot arm is switched off.

With large factories however, in order to rationalize the manufacturing process and improve efficiency, many robots surrounded by safety fences are arranged along the work conveying path, and automation of the manufacturing process is achieved by automatic conveying of the work and continuous processing. With this type of operating system wherein the work is conveyed automatically, it is difficult to provide a door to the entrance/exit of the safety fence. In such a situation, a system has been considered (U.S. Pat. No. 4,309,696) wherein sensors and the like are provided at the entrance/exit of the safety fence so that if a person passes through the entrance/exit, this is detected by the sensor. Judgement is thus made that someone is inside the safety fence, so that the drive power source for the arm of the robot inside the safety fence is switched off.

However at this time, it is necessary to reliably discriminate between work which is being automatically conveyed in succession through the entrance/exit, and a human, and to keep the drive power source for the arm of the robot on when work is being conveyed, to avoid a drop in work efficiency, and to reliably turn off the drive power source of the robot arm when a human enters, to maintain human safety.

In view of the above problems, it is an object of the present invention to provide a safety apparatus whereby, when a human enters inside a safety fence surrounding industrial machinery, the power source to the movable portion of the machine can be reliably stopped, while when a work piece is conveyed inside the safety fence, the power source to the movable portion of the machine is not stopped.

DISCLOSURE OF THE INVENTION

Consequently with the present invention, a safety apparatus which discriminates whether or not an object passing through an entrance/exit of a work space of a machine for processing work being conveyed, is a human or a work piece, and which generates a signal to stop the drive of a movable portion of the machine when a human passes through the entrance/exit to ensure the safety of said human, comprises a first object detection means for detecting a human, constructed so that output signal energy is decreased when an object is detected passing through the entrance/exit, and so as to err in a direction of decrease in an output signal energy condition in the case of a malfunction, a second object detection means for detecting a work piece, constructed so that output signal energy is increased when an object is detected passing through the entrance/exit, and so as to err in a direction of decrease in an output signal energy condition in the case of a malfunction, and a logical addition operation means for operating on the logical OR of the output signal of the first object detection means and the output signal of the second object detection means, and is constructed so that when an output signal energy condition of the logical addition operation means shows a binary variable logical value of "1","0", an output of the logical value "0" corresponding to the low energy condition becomes the signal to stop the drive of the movable portion of the machine.

As a result, when an object is present in the entrance/exit to the operating space, the output signal energy of the first object detection means decreases. At this time, if the object is a work piece, the output signal energy of the second object detection means increases. As a result the logical addition operation means generates an output of logic value "1" corresponding to the high energy condition, on the basis of the output from the second object detection means. In this case, the object passing through the entrance/exit is judged to be a work piece, so that a drive stop signal for the mechanical moving portion is not generated, leaving it in the movable condition to enable processing of the transported work piece.

On the other hand, if the aforementioned object is a human, the output signal energy of the second object detection means does not increase, so that the logical addition operation means generates an output of logic value "0" corresponding to the low energy condition. In this case, the object passing through the entrance/exit is judged to be a human, and a drive stop signal for the mechanical moving portion is generated, thereby stopping the drive of the moving portion to maintain operator safety.

More specifically, the first object detection means may comprise, a plurality of light emitting elements, vertically arrayed on one of the confronting wall faces of the work space entrance/exit, a plurality of excitation circuits provided for each of the respective light emitting elements to excite the light emitting elements at frequencies different to each other and to generate light beams from the corresponding light emitting elements, a plurality of light receiving elements vertically arrayed on the other of the wall faces and confronting the light emitting elements, which receive light beams from the confronting light emitting elements when an object is not present, a plurality of filter circuits provided for each of the respective light receiving elements, which only allow the passage of a light beam frequency signal generated by the light emitting element confronting the corresponding light receiving element, a plurality of amplification circuits which each amplify the output signal of a respective filter circuit, a plurality of rectification circuits which each rectify the output signal of a respective amplification circuit, and a logical product operation means for operating on the logical AND of the output signals of the plurality of rectification circuits and producing an output, and erring to give a logical value of "0" in the case of a malfunction.

Furthermore, the second object detection means may comprise, a transmitting coil disposed at the entrance/exit of the work space, an excitation circuit for exciting the transmitting coil to produce an alternating current signal, a receiving coil for receiving the alternating current signal from the transmitting coil and producing an output signal, an amplifying circuit for amplifying the output signal from the receiving coil, a rectifying circuit for rectifying the amplified output from the amplifying circuit, and a level detection circuit for producing an output signal of a logical value of "1" corresponding to a high energy condition when the output signal level of the rectifying circuit exceeds a predetermined level, the construction being such that when a work piece to be detected is present, the output signal energy of the receiving coil is increased on the basis of an electromagnetic induction effect, and the output signal level from the amplifying circuit for input to the level detection circuit becomes greater than a predetermined level.

Moreover, the work piece to be detected by the second object detection means is preferably made of metal.

When the work piece to be detected is not metal, it may be mounted on a pallet and transported thereby, and a metal element attached to the pallet.

Moreover, if the pallet is provided with a resonant circuit which resonates with the alternating current in the transmitting coil, the detection sensitivity can be increased.

Also the pallet may be provided with an information transmitting means which can transmit various types of information related to mechanical work processing operations, to a receiving coil.

BEST MODE FOR CARRYING OUT THE INVENTION

As follows is a detailed description based on the drawings, of embodiments of the safety apparatus according to the present invention.

Figure 1:
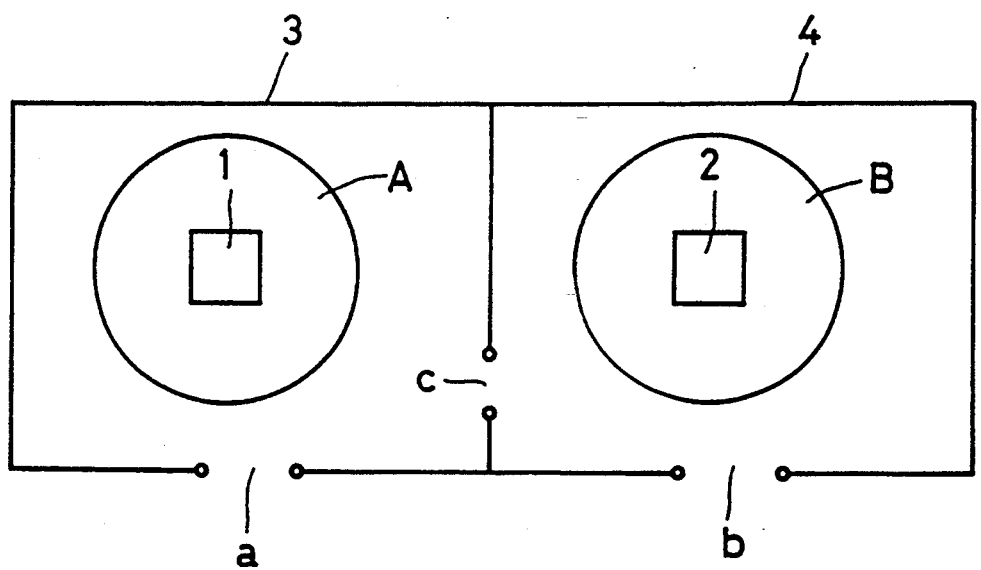
FIG. 1 is a schematic diagram of a mechanical operating system to which the present invention may be applied.

FIG. 1 illustrates an example of an operating system to which the present embodiment may be applied.

In FIG. 1, the operating spaces for respective robots 1, 2 which include the arm operating regions A, B (indicated by circles in FIG. 1) as the movable portions, are surrounded by safety fences 3, 4. Entrance/exits "a", "b" are provided in the respective safety fences 3, 4, while an entrance/exit "c" is provided in the safety fence located between the robots. Work is conveyed to inside the safety fence 3 from the entrance/exit "a" and is processed by robot 1. Subsequently, the work is conveyed via entrance/exit "c" to inside the safety fence 4 and processed by the robot 2. The work is then conveyed out through the entrance/exit "b". Automatic and continuous conveyance of the work is achieved using a device such as a belt conveyor.

A description is given based on FIGS. 2 to 5, of a construction of embodiments of a safety apparatus suitable for the case of an operating system wherein the work piece is metal.

Each of the above-mentioned entrance/exits "a'-'-"c", to be explained below, is provided with a human detecting sensor acting as a first object detecting means for detecting the presence of a human, and a work detecting sensor acting as a second object detecting means for detecting a metal work piece M.

Figure 3:
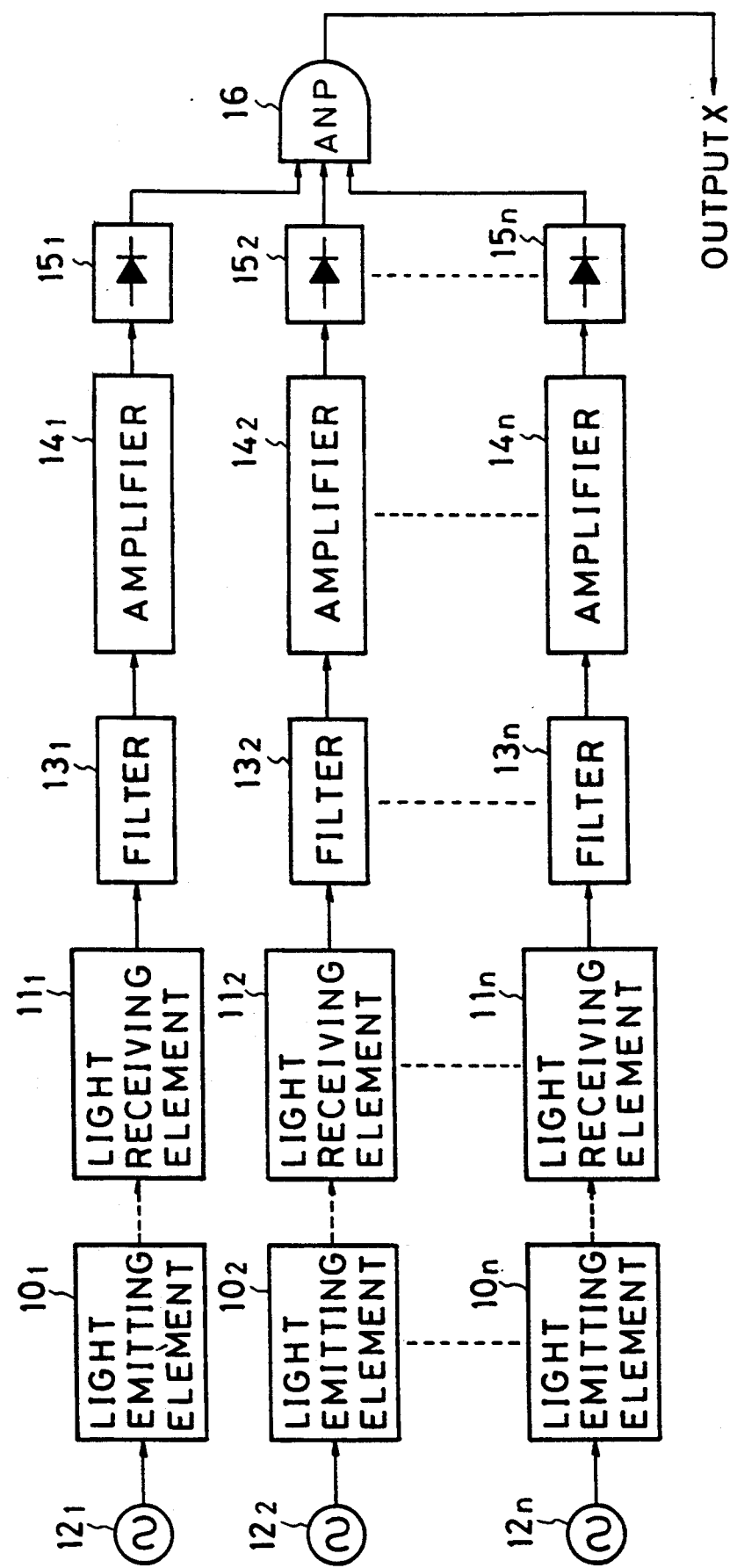
FIG. 3 is a block diagram showing the human detecting sensor circuit.
Figure 4:
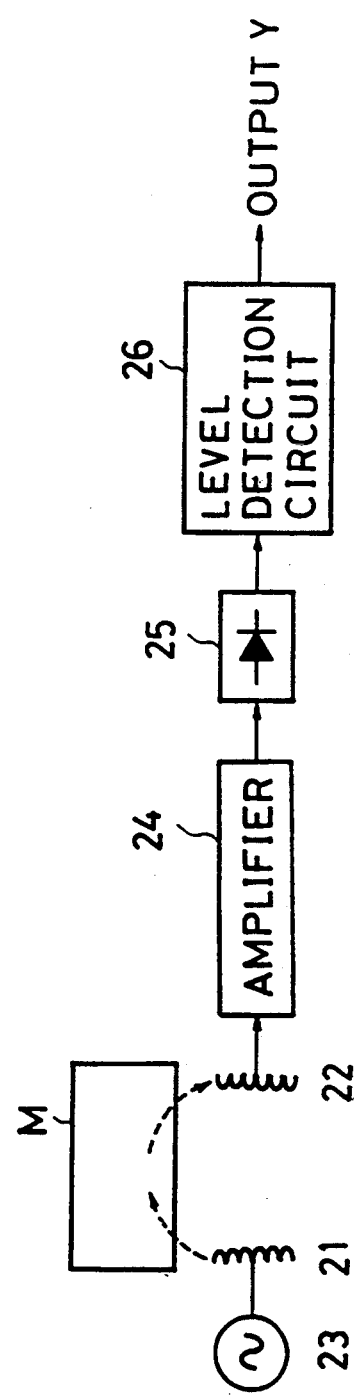
FIG. 4 is a block diagram showing the work detecting sensor circuit.
Figure 5:
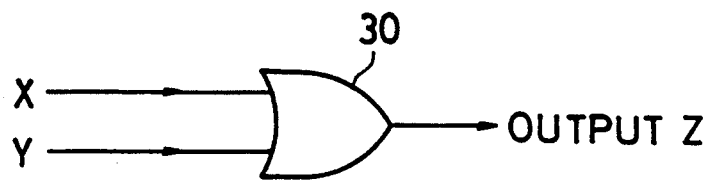
FIG. 5 is a diagram illustrating a final output circuit of a safety apparatus according to the first embodiment.

The human detecting sensor is constructed as described below.

n-light emitting elements $10_1$, $10_2$, through $10_n$ are aligned vertically on one wall face of the entrance/exits, and n-light receiving elements $11_1$, $11_2$ through $11_n$ are provided on the other wall face so as to confront the beforementioned light emitting elements $10_1$, $10_2$, through $10_n$. The light emitting elements $10_1$, $10_5$ $_2$ through $10_n$ are excited by respective exciting circuits $12_1$, $12_2$ through $12_n$ as shown in FIG. 3, having different frequencies to each other of $f_1$, $f_2$ through $f_n$, to emit light beams of corresponding frequencies $f_1$, $f_2$ through $f_n$ which cross the entrance/exit. The light receiving elements $11_1$, $11_2$ through $11_n$ receive the light beams from the light emitting elements $10_1$, $10_2$ through $10_n$ when an object is not present, and convert these into electrical signals. The converted outputs are then input to filter circuits $13_1$, $13_2$ through $13_n$ which will only pass the corresponding frequencies $f_1$, $f_2$ through $f_n$. The outputs from the filter circuits $13_1$, $13_2$ through $13_n$ are amplified by AC amplifiers $14_1$, $14_2$ through $14_n$, and rectified by rectifying circuits $15_1$, $15_2$ through $15_n$, and are then input to a conventional fail-safe AND gate 16 such as disclosed in U.S. Pat. No. 4,661,880, U.S. Pat. No. 4,667,184 etc. The AND gate 16 generates an output X of logic value "1" corresponding to a high energy condition, or of logic value "0" corresponding to a low energy condition on the basis of the level of the input signals from the respective rectifier circuits $15_1$, $15_2$ through $15_n$. Only when all of the input signals from the respective rectifier circuits $15_1$, $15_2$ through $15_n$ are at a higher level than the power-supply voltage for the AND gate 16 (a logic level of logic value "1") does it generate the output of logic value "1".

The beforementioned work detecting sensor is constructed as described below.

A transmitting coil 21 and receiving coil 22 are disposed so as to be close to work passing through the beforementioned entrance/exit. The coil width L for both coils 21, 22 is made sufficiently greater than the thickness of the entrance/exit wall face in the direction of work conveyance. The transmitting coil 21 is excited by the signal generating circuit 23 which acts as an exciting circuit. The receiving coil 22 receives a signal from the transmitting coil 21, and when a work piece M is present, the energy of the receiving coil output increases due to the electromagnetic induction effect. This output signal is input to an AC amplifier 24. The amplified output from the AC amplifier 24 is rectified by a rectifying circuit 25, and then input to a conventional level detection circuit 26 such as disclosed in U.S. Pat. No. 4,661,880, and U.S. Pat. No. 4,757,417 etc., which utilizes a comparator. The level detection circuit 26 generates an output Y of logic value "1" or of low level logic value "0", on the basis of the level of the input signal from the rectifying circuit 25. When a work piece M is present at the entrance/exit, the output signal level from the rectifying circuit 25 exceeds a predetermined level (a logic level corresponding to logic value "1"), so that the level detection circuit 26 generates an output of logic value "1". Preferably the threshold level of the level detection circuit 26 is set higher than the level of increase due to an electromagnetic inductance effect caused by metal material in the vicinity of the entrance/exit when a work piece M is not present.

The output X of the AND gate 16, and the output Y of the level detection circuit 26 are input to an OR gate 30, and based on the output Z from the OR gate 30, when this has a logic value of "1", the drive power supply for the robot arm is maintained in the ON condition to permit drive, while when this has a logic value of "0", the drive power supply for the robot arm is switched off.

As follows is a brief explanation of the type of characteristics required by a sensor for use in a fail-safe human detection sensor whereby human safety can be ensured even in the event of a malfunction.

Initial consideration is of two sensor types. One is constructed such that the light beam emitted from the light emitting element and normally received by the light receiving element, is cut off by the presence of an object and not received by the light receiving element. The other (a type wherein on the receiver side, the receiver energy is increased due to the existence of an object) is constructed such that the light beam emitted from the light emitting element and normally not received by the light receiving element, is reflected by an object when present and received by the light receiving element.

In this case, with the latter sensor construction, when for example a light beam is not produced due to failure of the light emitting element, then even if an object is present for example at a location for detection, an object detection signal is not generated. Consequently, when a sensor of such construction is used for detecting a human, then in the case of a malfunction, an output signal condition indicating the non-presence of a human is produced in spite of the fact that a human is present, thus producing a dangerous error.

On the other hand, with the former sensor construction, when for example a light beam is not produced due to failure of the light emitting element, then an object detection signal indicating that an object exists at a location for detection is generated. Consequently, with a sensor of such construction, in the case of a malfunction, an output signal condition indicating the presence of a human is produced, thus erring on the safe side with no possibility of erring to the danger side.

Accordingly, the human detection sensor according to the present embodiment constructed such that the output signal energy is reduced with detection of an object, is a fail-safe sensor giving an output signal condition indicating the presence of a human at the time of a malfunction.

Moreover, when used as a sensor for detecting work, it maintains the robot drive portion in the drive condition when work is detected. Hence the sensor construction must be such that a movable portion drive signal is generated with an increase of output signal energy when work is detected. With such an arrangement, when the output signal energy is lost due to a malfunction, the drive signal for the movable portion of the robot is not generated. The movable portion of the robot drive is thus stopped, resulting in a fail-safe sensor which errs to the safe side with respect to human safety.

Next is a description of the operation of the present apparatus with respect to entrance/exit "a". Operation for entrance/exits "b", "c" is similar and description is omitted for brevity.

Initially when the work piece M passes for example through the entrance/exit "a", the light beam from at least one of the light emitting elements $10_1$, $10_2$, through $10_n$ of the human detection sensor is blocked due to the passing of the work piece M. As a result, the output signal from the filter circuit connected to the light receiving element confronting the light emitting element which emitted the blocked light beam is lost. Hence, since not all of the output signals of the rectifying circuits $15_1$, $15_2$ through $15_n$ can have a logic value of "1", the output signal X of the AND gate 16 becomes a logic value of "0".

However, when the metal work piece M passes the work piece detection sensor, the alternating current signal from the transmitting coil 21 is strengthened due to the electromagnetic inductance effect, and received by the receiving coil 22, thus increasing the energy of the output signal from the receiving coil 22. The output signal of increased energy is amplified by the AC amplifier 24, rectified by the rectifying circuit 25, and then input to the level detection circuit 26. The input signal level from the rectifying circuit 25 rises above a predetermined level due to the increase in output signal energy from the receiving coil 22. As a result the output signal Y of the level detection circuit 26 becomes a logic value of "1".

Accordingly, when the work piece M is in the entrance/exit, the output Z of the OR gate 30 which operates on the output signal X and the output signal Y becomes a logic value of "1". Hence the robot movable portion is maintained in a drivable condition so that work processing is possible.

On the other hand, when a human passes through the entrance/exit "a", then with regards to the human detection sensor, as with the beforementioned case for the passing of a work piece, the light beam from at least one of the light emitting elements $10_1$, $10_2$, through $10_n$ is blocked by the passing of the human, so that not all of the output signals from the rectifying circuit $15_1$, $15_2$ through $15_n$ become a logic value of "1". Hence the output X of the AND gate 16 becomes a logic value of "0".

However, with regards to the work detection sensor, the passing of a human does not produce an electromagnetic inductance effect, so that the receiving signal energy of the receiving signal coil 22 is not increased. Hence the output signal energy of the receiving signal coil 22 is also not increased. As a result, the output signal level of the rectifying circuit 25 is lower than the predetermined level of the level detection circuit 26. The output signal Y of the level detection circuit 26 thus becomes a logic value of "0".

Accordingly, when a human passes the entrance/exit, the output signal X and output signal Y both become a logic value of "0", so that the output signal Z of the OR gate 30 becomes a logic value of "0". A drive stop signal for the robot moving portion is thus generated to stop the robot moving portion, thereby ensuring the safety of a human who passes inside the safety fence.

Moreover, in the case of a malfunction in the human detection sensor, such as one wherein a light beam from the light emitting element is not generated, the apparatus is fail-safe since in this case, the output signal X of the AND gate 16 becomes a logic value of "0", i.e. the signal condition indicating the presence of an object (human). Thus at the point in time wherein a work piece M is no longer present, the output signal of the OR gate 30 becomes a logic value of "0" so that the movable portion of the robot is stopped immediately. Furthermore, with the work detection sensor also, if a malfunction arises, the energy increase in the output signal of the receiving signal coil 22 is lost. As a result, the output signal of the level detection circuit 26 becomes a logic value of "0", i.e., the signal condition indicating that a work piece is not present. The output of the OR gate 30 thus becomes a logic value of "0", and the robot movable portion stops.

In this way the construction is such that for the human detection sensor, the output signal energy is reduced by the presence of an object, while for the work detection sensor the output signal energy is increased by the presence of an object. Hence with a construction wherein drive of the robot movable portion is controlled by the logical OR output of both sensors, it is possible to reliably differentiate between the entry of a human, or the entry of a work piece into the robot operating space. Thus human safety can be ensured with a fail-safe construction, without any drop in operating efficiency of an automatic conveyance work operating system.

The light beams from the light emitting elements $10_1$, $10_2$, through $10_n$ are emitted to the light receiving elements $11_1$, $11_2$ through $11_n$ side with a certain degree of spread. However, since the light beams of the light emitting elements $10_1$, $10_2$, through $10_n$ are given frequencies different from each other, and filter circuits $13_1$, $13_2$ through $13_n$ are provided to filter the output signals from the light receiving elements $11_1$, $11_2$ through $11_n$, then even if a light beam from a light emitting element other than a confronting light emitting element is incident on a light receiving element, the effect can be cut off by the filtering operation of the filter circuits $13_1$, $13_2$ through $13_n$. Hence the generation of an erroneous output signal by the AND gate 16 due to the reception of such a light beam can be prevented.

With the above embodiment, the description has been for the case of a metal work piece. In the case of non-metal work pieces these may be mounted on a pallet such as shown in FIG. 6 (A)–(C), and thereby conveyed.

Figure 6A:
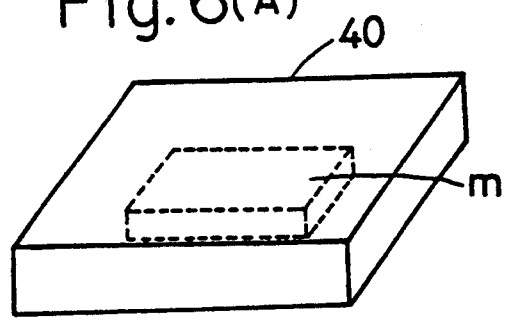
FIG. 6 is a diagram illustrating pallets for carrying work according to various other embodiments.

FIG. 6(A) shows an example of a pallet 40 in which is embedded a metal element "m". In this case, when the pallet 40 on which the work piece is mounted passes through the entrance/exit "a", the work detection sensor operates in a similar manner to that mentioned before due to the electromagnetic induction effect caused by the metal element "m" in the pallet 40. The work piece can thus be detected indirectly by detection of the pallet 40.

Figure 6B:
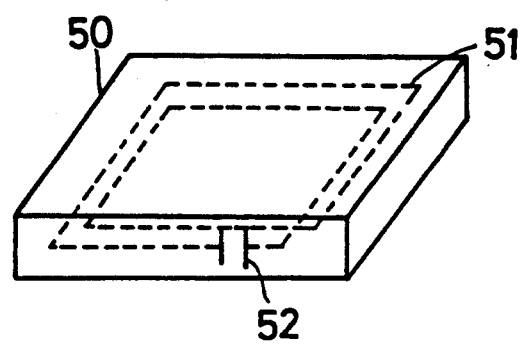

FIG. 6(B) shows an example of a pallet 50 in which is embedded a resonance circuit comprising a coil 51 and capacitor 52, which resonates with an alternating current signal generated from the transmitting coil 21.

In this case, when the pallet 50 on which the work piece is mounted passes through the entrance/exit "a", the received signal energy in the receiving coil 22 side increases due to the coil 51 inside the pallet 50. Moreover, the alternating current signal energy transmitted from the transmitting coil 21 to the receiving coil 22 is greatly amplified due to the resonance effect of the capacitor 52 and coil 51 resonance circuit. As a result, the detection sensitivity of the pallet 50, i.e. the work piece detection sensitivity, is considerably improved.

Figure 2:
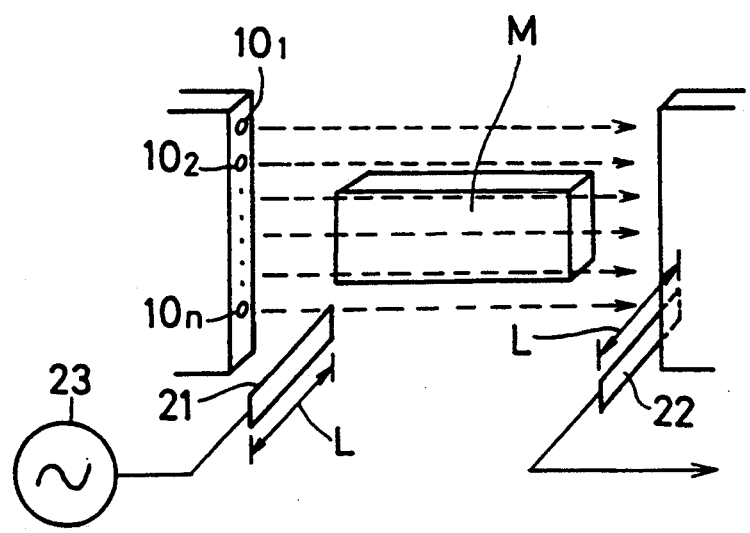
FIG. 2 is a simplified schematic diagram illustrating an example of an arrangement of a human detecting sensor and a work detecting sensor according to a first embodiment of the present invention.
Figure 6C:
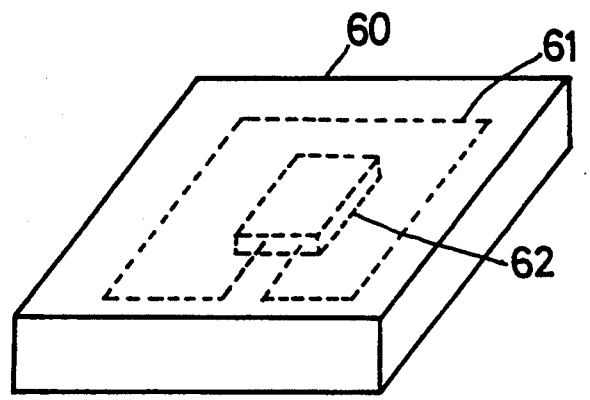

FIG. 6(C) shows an example of a pallet 60 in which is embedded a coil 61 with a transmitter 62 connected thereto. (in this case the transmitting coil 21 and signal generating circuit 23 shown in FIG. 2 are not required).

With this embodiment, it is possible to make up a system wherein a coding etc. is pre-stored, so that information relating to the pallet 60 and the work piece M mounted thereon (information such as work type and number, and pallet number etc.) is transmitted as a code signal from the transmitter 62 to the receiving coil 22. Hence as the pallet 60 passes, the information is transmitted to the robot side as processing information for the work piece carried on the pallet 60 and as pallet control information.

With these cases also, when the work is mounted on such pallets and conveyed, then in abnormal situations such as when the metal element "m" is not embedded in the pallet 40, or when a disconnection fault occurs in the coil 51 etc. inside the pallet 50, or when the transmitter 62 inside the pallet 60 cannot transmit a signal due to a low power supply (discharged battery), the output Y of the level detection circuit 26 does not become a logic value of "1". The system is thus fail-safe, with a signal to stop drive of the robot movable portion being generated when the pallet passes through the entrance/exit.

In the above embodiments a work detection sensor utilizing an electromagnetic induction effect is illustrated. However it may also be possible to have a work detection sensor constructed for example, with the light emitting elements and light receiving elements disposed on the same side, and the work piece or pallet detected when a light beam from a light emitting element is reflected by the work piece or the pallet and received by a light receiving element. In this case also, work piece or pallet detection information can be transmitted as an increase in the output signal energy of the light receiving element, making it similar to the present embodiments using an electromagnetic induction effect. Moreover, instead of using a pallet, a metal element or coil may be mounted directly to a non-metallic body.

With the present invention as described above, the human detection sensor uses a sensor constructed so as to transmit object detection information as a reduction in receiving side output signal energy, while the work detection sensor uses a sensor constructed so as to transmit the object detection information as an increase in receiving side output signal energy. With this construction, the drive or stop for the mechanical moving portion is controlled on the basis of the logical OR output of both sensors. Hence if an output signal is lost due to a sensor malfunction, the mechanical moving portion is always stopped. Thus excellent operator safety may be reliably ensured in a fail safe manner.

INDUSTRIAL APPLICABILITY

With the present invention in an automatic operation system for processing a work piece using an industrial machine such as a robot, the safety of an operator working at a work site which also involves machinery, can be considerably improved. Hence injury to the operator due to the machinery can be prevented, greatly improving industrial utility.

What is claimed is:

1. A safety apparatus which discriminates whether or not an object passing through an entrance/exit of a work space of a machine for processing work being conveyed, is a human or a work piece, and which generates a signal to stop the drive of a movable portion of said machine when a human passes through said entrance/exit to ensure the safety of said human, wherein said safety apparatus comprises, a first object detection means for detecting a human, constructed so that output signal energy is decreased when an object is detected passing through said entrance/exit, and to produce a reduced output signal in the case of a malfunction, a second object detection means for detecting a work piece, constructed so that output signal energy is increased when an object is detected passing through said entrance/exit, and to produce a reduced output signal in the case of a malfunction, and a logical addition operation means for operating on the logical OR of the output signal of the first object detection means and the output signal of the second object detection means, so that when an output signal energy condition of said logical addition operation means shows a binary variable logical value of "1","0", an output of the logical value "0" corresponding to the low energy condition becomes said signal to stop the drive of the movable portion of said machine.

2. A safety apparatus as claimed in claim 1, wherein said first object detection means comprises, a plurality of light emitting elements vertically arrayed on one of the confronting wall faces of said work space entrance/exit, a plurality of excitation circuits provided for each of the respective light emitting elements to excite the light emitting elements at frequencies different to each other and to generate light beams from the corresponding light emitting elements, a plurality of light receiving elements vertically arrayed on the other of the wall faces and confronting said light emitting elements, which receive light beams from the confronting light emitting elements when an object is not present, a plurality of filter circuits provided for each of the respective light receiving elements, which only allow the passage of a light beam frequency signal generated by the light emitting element confronting the corresponding light receiving element, a plurality of amplification circuits which each amplify the output signal of a respective filter circuit, a plurality of rectification circuits which each rectify the output signal of a respective amplification circuit, and a logical product operation means for operating on the logical AND of the output signals of the plurality of rectification circuits and producing an output, and erring to give a logical value of "0" in the case of a malfunction.

3. A safety apparatus as claimed in claim 1, wherein said second object detection means comprises, a transmitting coil disposed at the entrance/exit of said operating space, an excitation circuit for exciting said transmitting coil to produce an alternating current signal, a receiving coil for receiving the alternating current signal from said transmitting coil and producing an output signal, an amplifying circuit for amplifying the output signal from said receiving coil, a rectifying circuit for rectifying the amplified output from said amplifying circuit, and a level detection circuit for producing an output signal of a logical value of "1" corresponding to a high energy condition when the output signal level of said rectifying circuit exceeds a predetermined level, the construction being such that when a work piece to be detected is present, the output signal energy of the receiving coil is increased on the basis of an electromagnetic induction effect, and the output signal level from said amplifying circuit for input to said level detection circuit becomes greater than a predetermined level.

4. A safety apparatus as claimed in claim 3, wherein the work piece to be detected is made from a metal.

5. A safety apparatus as claimed in claim 3, wherein the work piece to be detected is mounted on a pallet and transported thereby, and a metal element is attached to said pallet.

6. A safety apparatus as claimed in claim 3, wherein the work piece to be detected is mounted on a pallet and transported thereby, and said pallet is provided with a resonant circuit which resonates with an alternating current signal in said transmitting coil.

7. A safety apparatus as claimed in claim 3, wherein the work piece to be detected is mounted on a pallet and transported thereby, and said pallet is provided with an information transmitting means which can transmit various types of information related to mechanical work processing operations, to a receiving coil.

* * * * *